Dec. 3, 1940.   A. LANGE   2,223,629
MOLD AND STERILIZER FOR DENTAL IMPRESSION COMPOUNDS
Filed Dec. 12, 1938   2 Sheets-Sheet 1
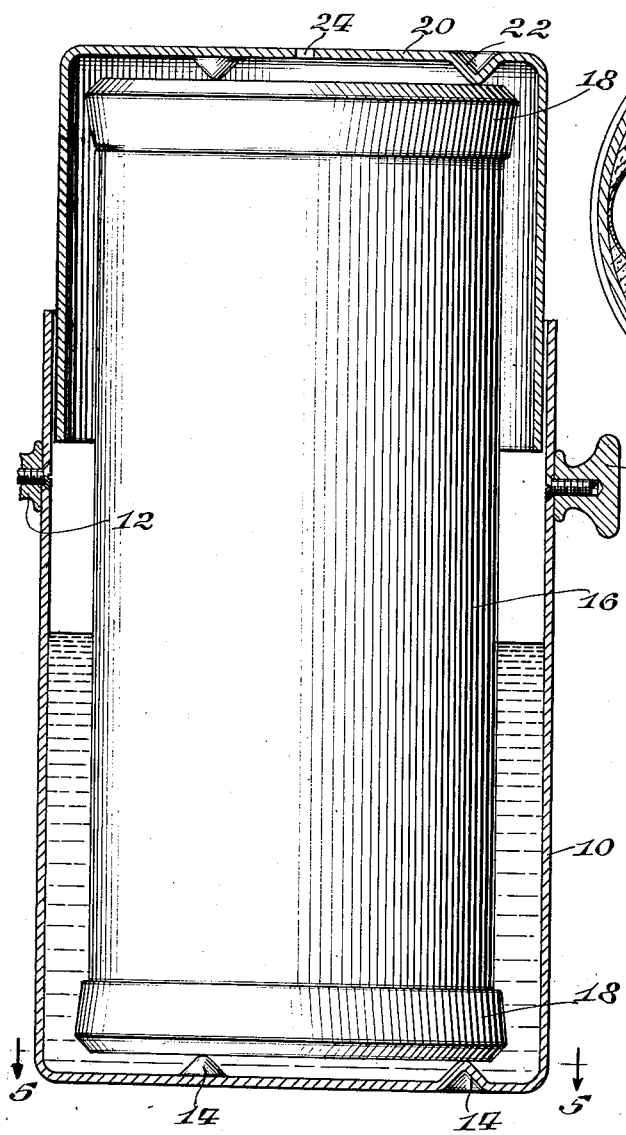
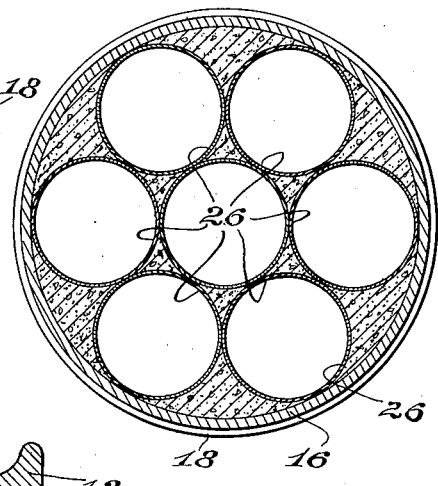
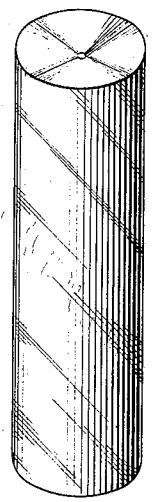
Inventor:
Albert Lange
By Williams, Bradbury, McCaleb & Hinkle
Attys.

Dec. 3, 1940.   A. LANGE   2,223,629
MOLD AND STERILIZER FOR DENTAL IMPRESSION COMPOUNDS
Filed Dec. 12, 1938   2 Sheets-Sheet 2
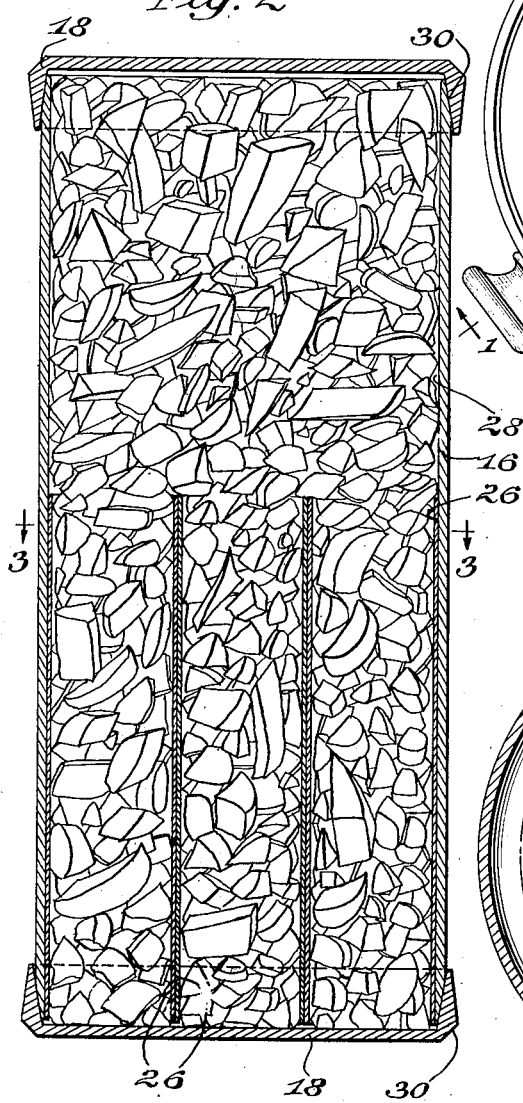
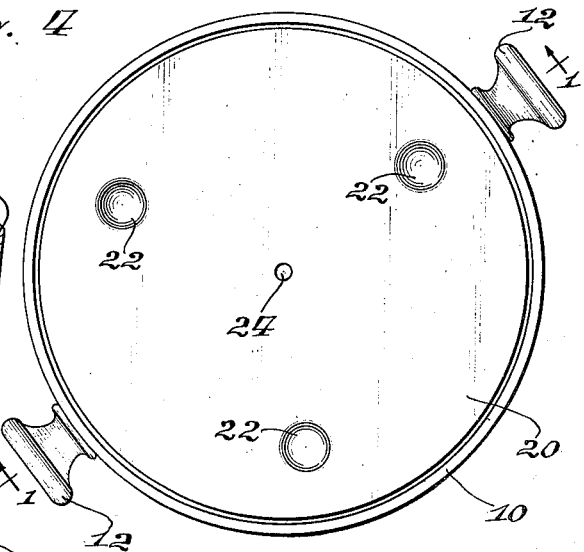
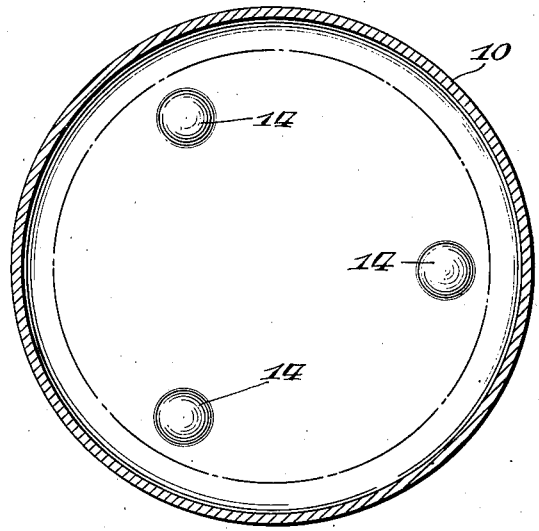
Inventor:
Albert Lange
By Williams, Bradbury, McCaleb & Hinkle
Attys.

Patented Dec. 3, 1940

2,223,629

UNITED STATES PATENT OFFICE 2,223,629

MOLD AND STERILIZER FOR DENTAL IMPRESSION COMPOUNDS

Allert Lange, Madison, Wis.

Application December 12, 1938, Serial No. 245,335

5 Claims. (Cl. 18—39)

My invention relates generally to devices for reclaiming elastic impression compounds, such as are used by dentists to make impressions of portions of the teeth and portions of the oral cavity.

In the making of impressions of teeth and the like, it is common practice to utilize an impression compound which is sufficiently plastic at temperatures slightly above body temperature to conform readily to the shape of teeth, and which will solidify to form a mold usable in various ways in the practice of orthodontia, as well as in the preparation of inlays, bridge work, and the like.

In normal practice, the impression compound is supplied in cylindrical sticks which are inserted in a syringe-like device, and the latter placed in hot water so as to cause substantial liquefication of the compound. The syringe is usually provided with a means for agitating the compound so as to secure homogeneous mixture of its ingredients. After the compound has become sufficiently fluid, it is discharged from the syringe into a dental impression tray or other receptacle, and the impression is then made. The compound containing the impression is then cooled in order to cause it to jell or harden, whereupon it may be used as a mold, from which positive impressions may be made. After a positive impression has been made, the elastic molding compound impression is usually no longer of any use, and is ordinarily discarded. By the use of the apparatus of my invention, the elastic molding compound may be reclaimed.

The reclamation of the compound may be accomplished by first breaking the impression mold into small fragments, washing these fragments to remove foreign matter, drying the compound to an extent sufficient to remove excess moisture, and then placing it in the sterilizer and mold of my invention.

It is thus an object of my invention to provide an improved means for sterilizing and reclaiming elastic molding compounds.

A further object is to provide an improved sterilizer and mold which is simple in construction, economically manufactured, and easily operated.

Other objects will appear from the following description, reference being had to the accompanying drawings, in which:

Figure 1 is a central vertical sectional view of the sterilizer and mold, the mold being shown in elevation;

Figure 2 is a central vertical sectional view of the mold and container;

Figure 3 is a transverse sectional view of the mold taken on the line 3—3 of Figure 2;

Figure 4 is a plan view of the sterilizer and mold;

Figure 5 is a transverse sectional view taken on the line 5—5 of Figure 1; and,

Figure 6 is a perspective view of one of the sticks of elastic molding compound as made in the mold.

As shown in Figure 1, the apparatus comprises a lower shell 10 having a pair of handles 12 of heat insulating material suitably secured thereto. The shell has a bottom provided with three indentations 14 generally conical in shape, to provide a support for the mold. The mold comprises a cylindrical body 16, the ends of which are closed by similar caps 18. A cover 20 of inverted cup-shape telescopes freely in the upper end of the shell 10, it being provided with conical indentations 22 for contact with the upper cap 18. The cover also has a vent aperture 24 formed therein for the escape of steam. The tubular cylindrical body 16 has a plurality of seamless tubes 26 secured therein, as by soldering or welding, these tubes likewise being welded or soldered to each other at their points of contact so as to be in good heat conducting relation with the body 16, and with each other. The tubes 26 are approximately one-half as long as the body 16, as shown in Figure 2, and thus provide a free space 28 in the upper half of the body 16 for the reception of particles of the scrap impression compound. The spaces between the tubes 26 are filled with any suitable heat-resistant, heat-conducting plastic filler, such as a cementitious rock composition.

As shown in Figure 2, the ends of the body 16 are provided with tapering surfaces 30 for sealing engagement with the complementally shaped inner surfaces of the caps 18. The caps 18 thus fit tightly, forming water- and steam-tight closures for the ends of the body 16.

In use, the space 28 in the upper end of the container 16, as well as the tubes 26, is filled with properly washed and dried fragments of the elastic impression compound. The user may conveniently use the mold body 16 as a handy receptacle in which to store the scrap material until a sufficient quantity is accumulated. The caps 18 are then pressed tightly over the end of the mold body 16, and it is thereupon placed in the lower shell 10, and the upper shell or cover 20 placed in position, after partially filling the lower shell 10 with water. The assembled unit may then be placed upon a stove and permitted to boil for approximately 30 or 40 minutes. Upon being heated to a temperature approximating 212° F., the particles of the elastic impression compound will soften and flow into the mold tubes 26, since at this temperature the compound becomes a rather viscous liquid. By maintaining the temperature of 212° for some time in this manner, the compound is sterilized. Thereafter, the apparatus may be removed from the stove and permitted to cool to room temperature, whereupon the compound will solidify or jell. Upon removal of the cylindrical body 16 and the caps 18 therefrom, sticks of the compound, as shown in Figure 6, may be ejected from the mold tubes 26 by any suitable plunger-like tool.

The sticks shown in Figure 6 may then be used in the usual manner, since they are now of proper size and shape for insertion in the usual syringe apparatus with which the compound is handled.

While I have shown and described a particular form of my invention, it will be apparent to those skilled in the art that it may be embodied in various other forms, all coming within the scope of the invention. I therefore desire, by the following claims, to include within the scope of my invention all such modified and varied forms of the invention by which substantially the results of my invention may be obtained by substantially the same means.

I claim:

1. In a mold and sterilizer for dental impression compound, the combination of a container having a plurality of tubular mold forms secured therein in heat conducting engagement with the wall of said container, said forms being open at each end and having their lower ends flush with the lower end of said container, said container having removable closures for its upper and lower ends, and said molds and container being constructed of material of high thermal conductivity.

2. In a mold and sterilizer for dental impression compound, the combination of a container having a plurality of tubular mold forms secured therein in heat conducting engagement with the wall of said container, said forms being open at each end and having their lower ends flush with the lower end of said container, said container having removable closures for its upper and lower ends, and said molds and container being constructed of material of high thermal conductivity, said container being of greater length than said molds and having a storage space for a quantity of compound in fragment form above the open ends of said molds in said container.

3. In a mold and sterilizer for dental impression compound, the combination of a container having a plurality of tubular mold forms secured therein in heat conducting engagement with the wall of said container, said forms being open at each end and having their lower ends flush with the lower end of said container, said container having removable closures for its upper and lower ends, and said molds and container being constructed of material of high thermal conductivity, said container being of greater length than said molds and having a storage space for a quantity of compound in fragment form above the open ends of said molds in said container, and said molds comprising tubes of substantially cylindrical form, and means filling the space between the molds, comprising a cementitious compound.

4. In a mold and sterilizer for dental impression compound, the combination of a container having a plurality of tubular mold forms secured therein in heat conducting engagement with the wall of said container, said forms being open at each end and having their lower ends flush with the lower end of said container, said container having removable closures for its upper and lower ends, and said molds and container being constructed of material of high thermal conductivity, said container being carried in a larger cylindrical metal container having inwardly pressed protuberances spacing the major portions of the bottoms of said containers, whereby the molds and compound may be uniformly heated by heat applied to the outer container and acting on water in said outer container.

5. In a mold and sterilizer for dental impression compound, the combination of a container having a plurality of tubular mold forms secured therein in heat conducting engagement with the wall of said container, said forms being open at each end and having their lower end flush with the lower end of said container, said container having removable closures for its upper and lower ends, and said molds and container being constructed of material of high thermal conductivity, and an outer container for said sterilizer comprising a metal member of substantially cylindrical shape, having an open top and having its bottom formed with inwardly extending spacing formations engaging the bottom of the first-mentioned container, and a cover for said outer contianer, comprising a member of similar form to said outer container, and having spacing formations whereby it is supported on the upper end of said first-mentioned container, said cover having its walls slightly spaced from the walls of said outer container and in telescoping relation therewith, whereby vapor from water in said outer container may apply heat uniformly to the upper portion of said first-mentioned container, and the latter may be uniformly heated by water in said outer container to a sterilizing temperature.

ALLERT LANGE.